United States Patent [19]

Bonsack et al.

[11] 4,329,322

[45] May 11, 1982

[54] CHLORINATION OF TITANIFEROUS MATERIAL USING TREATED COAL FOR VANADIUM REMOVAL

[75] Inventors: James P. Bonsack, Aberdeen; Fred Schneider, Jr., Baltimore, both of Md.

[73] Assignee: SCM Corporation, New York, N.Y.

[21] Appl. No.: 227,631

[22] Filed: Jan. 23, 1981

Related U.S. Application Data

[63] Continuation-in-part of Ser. No. 95,457, Nov. 19, 1979, abandoned.

[51] Int. Cl.$^3$ .............................................. C01G 23/02
[52] U.S. Cl. ...................................... 423/74; 75/1 T; 423/77; 423/78; 423/79; 423/76; 423/62
[58] Field of Search ...................... 423/62, 74, 76–79; 75/1 T

[56] References Cited

U.S. PATENT DOCUMENTS

| | | |
|---|---|---|
| 2,668,424 | 2/1954 | Mueller ................................. 423/77 |
| 2,761,760 | 9/1956 | Kamlet . |
| 3,258,064 | 6/1966 | Gniewek et al. ..................... 423/77 |
| 3,418,074 | 12/1968 | Sargeant ................................ 423/77 |
| 3,497,326 | 2/1970 | Sologucho . |
| 3,627,481 | 12/1971 | Seroni et al. .......................... 423/77 |
| 3,733,193 | 5/1973 | Fox et al. ............................... 75/1 T |
| 3,787,556 | 1/1974 | Piccolo et al. ........................ 423/77 |
| 3,871,874 | 3/1975 | Winter ................................... 423/77 |
| 3,977,862 | 8/1976 | Glaeser . |

Primary Examiner—Herbert T. Carter
Attorney, Agent, or Firm—Robert A. Sturges; Merton H. Douthitt

[57] ABSTRACT

Vanadium impurities in chlorinated titaniferous materials are rendered easily removable by reacting said titaniferous materials with a high surface area carbon during the chlorination process. A process for preparing said high surface area carbon is also described.

6 Claims, 1 Drawing Figure

CHLORINATION OF TITANIFEROUS MATERIAL USING TREATED COAL FOR VANADIUM REMOVAL

This is a continuation-in-part of U.S. Ser. No. 095,457 filed Nov. 19, 1979 and now abandoned.

BACKGROUND OF THE INVENTION

This invention relates to the separation of vanadium values from titanium values in mixtures of titanium and vanadium chlorides.

Titaniferous materials are often subjected to chlorination, as chlorination is an efficient and economical way to obtain a high purity titanium source for making titanium alloys, titanium compounds, and especially pigmentary titanium dioxide.

Several processes have been described in the art for the chlorination of titaniferous materials. Such processes generally react a titanium-containing raw material such as rutile or ilmenite ore, with a chlorine-providing material and a carbon-containing reductant according to one or both of the following equations:

$$TiO_2 + 2Cl_2(g) + C(s) \rightarrow TiCl_4(g) + CO_2(g)$$

$$TiO_2 + 2Cl_2(g) + 2C(s) \rightarrow TiCl_4(g) + 2CO(g)$$

Iron is a common impurity in titaniferous raw materials, and most chlorination processes are effective for simultaneously chlorinating the Ti and Fe values of these raw materials as shown in the following reactions:

$$2FeTiO_3 + 6Cl_2(g) + 3C(s) \rightarrow 2TiCl_4(g) + 3CO_2(g) + 2FeCl_2$$

$$FeTiO_3 + 3Cl_2(g) + 3C(s) \rightarrow TiCl_4(g) + 3CO(g) + FeCl_2$$

Chlorination reactions are generally carried out at about 1000° C., but can be carried out at any temperature in the range from about 800° C. to about 2000° C., using various carbon reductants and chlorine sources, including chlorine gas and chlorine-containing compounds. The titaniferous raw materials to be chlorinated can be preformed into briquets or the process can be conducted in a fluid bed using granular materials. When a fluid-bed process is used, generally the chlorine-providing material is supplied to the bottom of the bed and product titanium tetrachloride (TiCl₄) is removed from the top. Fluidization is generally controlled such that the bed remains fluidized and yet fine, solid particulate materials are not carried out with the product.

Selective chlorination processes also exist and are designed to chlorinate only the Ti values or the Fe values of the raw material. A carbon reductant and a chlorine source are used and reaction temperatures are similar to non-selective processes. However, selective processes utilize a chlorine source consisting at least partially of iron chlorides, react the titaniferous raw materials in a dilute phase, react the titaniferous raw materials at a specially high temperature, or a combination of the above.

Titanium raw materials such as rutile and ilmenite ores also usually contain vanadium compounds as impurities which adversely affect the titanium products produced. For example, pigmentary $TiO_2$ can only tolerate about 10 ppm. vanadium in the titanium tetrachloride from which the $TiO_2$ is made without discoloration. Removal of such impurities has heretofore been a complicated and burdensome process because of the similarity between the chemical and physical characteristics of titanium compounds and vanadium compounds. For example, $TiCl_4$ melts at $-25°$ C. and boils at 136.4° C. and $VCl_4$ melts at $-28°$ C. and boils at 148.5° C. This parallelism of properties permeates a comparison of the compounds of these two elements. Therefore, in the conventional chlorination process the vanadium values in a titaniferous raw material react in substantially the same manner as the titanium values, and their respective chlorinated products have nearly identical chemical and physical properties. Therefore, it is extremely difficult to separate the undesirable chlorinated vanadium values from the desirable titanium values. Fractional distillation, for example, will remove most impurities from $TiCl_4$, but is ineffective for removing vanadium impurities.

Processes which are used commercially remove vanadium impurities from $TiCl_4$ by refluxing with copper, treating with $H_2S$ in the presence of a heavy metal soap, or treating with an alkali metal soap or oil to reduce vanadium impurities to a less volatile form. In each of these processes the treated $TiCl_4$ is then subjected to a further distillation. However, the organic materials used tend to decompose and deposit sticky, adhering coatings on heat exchanger surfaces, pipes, and vessel walls. This causes shutdowns of the process and requires frequent maintenance of the equipment.

In accord with this invention, a simple, efficient, and economical process has now been discovered for separating the vanadium values from chlorinated titaniferous materials. The process of this invention utilizes a high surface area carbon for reacting with the titaniferous materials during the chlorination process. The use of this high surface area carbonaceous material causes the vanadium values present in the titaniferous material to be reduced to a less volatile form so that they can be easily removed as a solid from the gaseous or liquid $TiCl_4$ product.

One advantage of the present process is that it can be performed in existing equipment for the chlorination of titaniferous material. Another advantage is that it employs economical raw materials. Still another advantage is that the CO value of the tail gas produced is sufficiently enhanced such that said tail gases will support combustion and can be burned to effect complete conversion to $CO_2$ and thus eliminate the pollution problem they previously created. These and other advantages will become more apparent in the "Detailed Description of the Invention".

SUMMARY OF THE INVENTION

According to the present process, titaniferous materials and porous carbon reductant having micropores with a pore diameter of less than about 20 Å are fluidized in a fluid-bed and contacted with a chlorine-providing gas selected from the group consisting of $Cl_2$, organochlorides, or mixtures thereof at a temperature in excess of about 800° C. Efficient chlorination is achieved and upon cooling the product's vanadium impurities are readily separable from the chlorinated titanium.

DETAILED DESCRIPTION OF THE INVENTION

Figure 1:
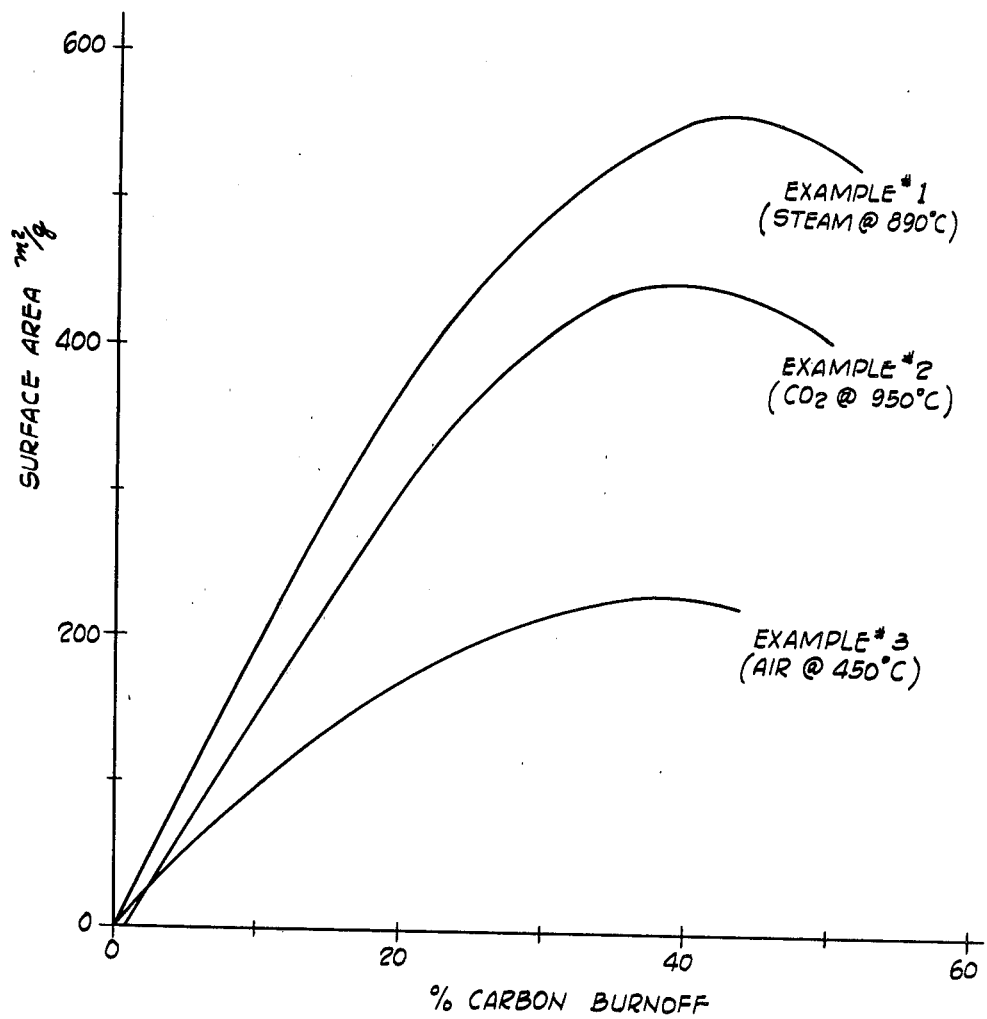

The present invention is an improved process for rendering vanadium impurities readily removable from chlorinated titaniferous materials.

According to an embodiment of the present invention, during the chlorination process the titaniferous material is reacted with a high surface area carbon. The amount of carbon, the carbon's surface area, pore size, and pore size distribution and the reaction temperature being effective to cause the vanadium values to be reduced to a less volatile form.

The reduction of the vanadium values to a less volatile form can be accomplished by substituting the high surface area carbon for all or part of the carbon-containing reductant in a conventional chlorination process. Also, the high surface area carbon can be added in addition to the carbon-containing reductant. This is done in the chlorinator itself during the chlorination process. The carbon-containing reductant used in the conventional chlorination of titaniferous materials is typically a granular material which will substantially pass through an 8-mesh screen (U.S. Standard Sieve). Such materials, however, have a relatively low surface area, typically less than about 1.0 $m^2/g$. For example, granular petroleum coke has a surface area of less than 0.1 $m^2/g$., natural graphite about 0.4 $m^2/g$., and coke breeze about 0.3 $m^2/g$. However, carbons useful in the present invention have a surface area of at least about 10 $m^2/g$. Such carbons must also have sufficient average pore size and pore size distribution such that substantially all of this surface area can be utilizing during the reaction. If, however, the surface area is at least 100 $m^2/g$., then sufficient surface will be present for adequate reaction to take place regardless of the average pore size or pore size distribution. Carbons with a surface area of at least 100 $m^2/g$. are preferred.

The surface area of the carbon can be temperature dependent and therefore changes during the chlorination reaction. The change is dependent upon the preparation and origin of the carbon. Carbons with small pores (<20 Å diameter) tend to exhibit decreased surface area when heated to 1000° C. in $N_2$ (conditions similar to those encountered during the chlorination process). It is believed the very small pores tend to close up and thus a lesser surface area is exposed. Also, carbons that have predominantly larger pores (>20 Å diameter) tend to exhibit increased surface area when heated to 1000° C. in $N_2$. In this case, the heat is believed to cause the evolution of more volatiles and thus create more pores and expose more surface.

Therefore, if a carbon has a surface area of 10 $m^2/g$. to 100 $m^2/g$., that carbon must also have a sufficient distribution of larger pores such that the surface area will not decrease below 10 $m^2/g$., and preferably increase, when heated to reaction temperatures. Further, a carbon with a surface area of at least 100 $m^2/g$. will usually have sufficient surface area remaining after heating to reaction temperatures to be effective, regardless of the pore size or pore size distribution.

It is advantageous for fluid-bed chlorination processes that the carbon comes from a mineral rather than an animal or vegetable source. Animal- and vegetable-derived carbons have higher levels of impurities, especially calcium and alkali metal impurities. Such impurities form nonvolatile liquid chlorides at about 1000° C. during the chlorination process. Such chlorides remain in the fluidized bed and tend to cause stickiness and decrease the amount of fluidization in the bed.

A preferred high surface area carbon is granular coal treated to increase its surface area. Coal is an inexpensive source of carbon and can be obtained relatively free from calcium and alkali metal impurities. Coal is readily available in granular form of various sizes and size distributions. Granular coal of −8 mesh (commercially known as #4 Buck) or finer is typical.

The granular coal is treated by introducing it into a fluidized bed at an elevated temperature with air, $CO_2$ and/or steam until the surface area has increased sufficiently. About 5% or more of the coal by weight will be burned off during treatment. Generally to get a higher surface area, higher coal burnoff is required. Therefore, it is preferred to treat to the minimum effective surface area in order to obtain maximum yield from the raw materials. This treatment should be carried out above about 400° C. When steam or $CO_2$ is used, the reaction is endothermic, with air the reaction is exothermic and will maintain itself without the introduction of any outside heat source. Preferably, such process is carried out on a continuous basis with continuous feeding of coal and removal of treated product.

The control of average pore size and pore size distribution is difficult with this treatment process. Typically, the average pore size produced (<about 20 Å diameter) is such that the surface area will decrease when heated to chlorination temperatures in $N_2$. Therefore, it is preferable to treat coal with this process until a surface area of at least about 100 $m^2/g$. is obtained such that average pore size and pore size distribution will not be factors in the effectiveness of the treated coal for use in the present invention, and an effective amount of surface area will always be present.

The coal used is preferably high rank (anthracite) rather than low rank (bituminous) because the high rank coals attain a higher surface area during the above treatment. The coal introduced into the treatment process can be either wet or dry. Dry coal is actually preferred; however, wet granular coal is a much more readily available commercial product, water being present only to hold down dusting during transportation.

Other processes for making high surface area carbons are readily available. Any available process for increasing the surface area of a carbon can be used for making a carbon useful in the present invention, so long as a sufficiently high surface area or surface area, pore size, and pore size distribution combination are obtained. Such processes are typically used for producing activated carbon. Commercially available activated carbons have surface areas from about 300 to about 3000 $m^2/g$. and are effective in the instant process. However, such materials are substantially more expensive at the present time than the above-described treated coals. Also, it has been found that the high surface area carbons useful in the present invention do not require the properties of activated carbon. Specifically, a carbon can be effective in the instant process without possessing any of the absorption or adsorption properties of activated carbons, because the present process is not a sorption process.

When the chlorinating and reacting steps of the process of the present invention are followed, the chlorinated vanadium values produced are in a different physical form from the chlorinated titanium values. For example, between about 450° C. and 136° C., the chlorinated titanium values (primarily $TiCl_4$) are gaseous whereas the chlorinated vanadium values produced (believed to be $VCl_3$) are solid, and below about 136° C. to about −25° C. the chlorinated titanium values are liquid, while the chlorinated vanadium values remain solid. Furthermore, the chlorinated vanadium values are insoluble in both the gaseous and the liquid chlorinated titanium values. Therefore, below about 450° C. a conventional solid-gas separation or solid-liquid separation is effective to remove the vanadium values contained in the chlorinated titaniferous material.

A preferred solid-gas separation is the use of a cyclone separator at a temperature of about 140° C. to about 300° C. and preferably about 175°–200° C.; such separation is used in conventional chlorination processes to collect particulates in the $TiCl_4$ gas stream, but does not remove vanadium values during conventional processing.

Preferred solid-liquid separations are decanting and filtration.

A further benefit derived from the reaction of the high surface area carbon with a titaniferous material during chlorination is an enhancement of the CO content of the tail gas produced. Tail gases are those gases that accompany the product as it leaves the chlorinator and must be disposed of as an effluent of the process. Specifically, the $CO_2$:CO ratio in the tail gases of a conventional chlorination process is about 1 or 2:1. Such tail gas must be treated before being expelled into the environment because of the high CO level (about 33–50%). This gas cannot support combustion; therefore, treatment by mere burning is precluded and other effective treatments are costly. However, when a high surface area carbon is reacted with titaniferous material during the chlorination process according to the present invention, the $CO_2$:CO ratio is reduced to about 0.01 or 0.02:1 (about 98 or 99 percent CO). Even though this tail gas contains substantially more CO than does the tail gas from the conventional process, this tail gas can be burned directly before expelling into the atmosphere as a means of treatment and thus is substantially easier and less expensive to treat than the tail gas of the conventional process. Alternatively, the CO-rich tail gas can be used for its fuel value by burning it in a boiler, kiln, or other.

The following examples will show ways in which this invention has been practiced. These examples are not intended to be limiting of the invention. In the examples, all temperatures are in degrees Centigrade and all percentages in parts by weight, unless otherwise specified.

EXAMPLE 1

Wet, granular (−18 mesh), anthracite coal was placed in a fluid-bed reactor and fluidized by introduction of hot steam at a superficial velocity of 0.8 feet per second at a temperature of 890° C. The surface area of the granular coal was measured by the BET (Brunauer, Emmett, and Teller) method for surface area determination. Surface area as expressed here and throughout this specification is "effective surface area" as determined from the $N_2$ adsorption isotherm at −195° C. and application of the standard BET procedure. Assurance of accuracy is difficult due to the difficulty of measuring surface area in microporous materials. A plot of surface area versus carbon burn-off is hown in FIG. 1. Coal treated according to this example with about 5% or greater carbon burn-off is effective in the present process.

EXAMPLE 2

In the procedure of Example 1, $CO_2$ at 950° C. was used in place of steam. A plot of surface area versus percent of carbon burn-off is shown in FIG. 1. Coal treated according to this example with about 7% or greater carbon burn-off is effective in the present process.

EXAMPLE 3

In the procedure of Example 1, air at 450° C. was used in place of steam. A plot of surface area versus percent of carbon burn-off is also shown in FIG. 1. Coal treated according to this example with about 10% or greater carbon burn-off is effective in the present process.

FIG. 1, a graph, is attached.

EXAMPLE 4

Rutile ore containing about 96.1% $TiO_2$, 1.2% $Fe_2O_3$, and 0.4% $V_2O_5$ was chlorinated in a fluid-bed chlorinator at 1000° C. Chlorine gas and a coal treated in accordance with Example 1 having a 5% carbon burn-off were used. A fluid-bed depth of 14–15 inches was maintained by continuously feeding fresh ore and treated coal. The chlorination was run for a period of 3 hours, and the $CO_2$:CO ratio in the chlorinator tail gas was measured about every 10 minutes via gas chromatography. The gaseous product stream was allowed to cool partially and was passed through a solid-gas cyclone-type separator. The temperature of the gas stream passing through the separator was controlled at about 175° C., however, the actual temperature varied between 150° and 200° C. The solids collected in this separator include fluid-bed blow-over, $FeCl_2$ and most of the vanadium values (believed to be $VCl_3$). $TiCl_4$ was then condensed from the product gas stream and solids were allowed to settle. These solids are present mainly due to the inefficiency of the cyclone separator, and contain essentially the same components as the cyclone solids. The clear sample of supernatant $TiCl_4$ was poured off and analyzed for vanadium. The surface area of the carbon source, the average $CO_2$:CO ratio, and the vanadium impurity level in the $TiCl_4$ product are shown in Table I.

EXAMPLE 5

In the procedure of Example 4, coal treated in accordance with Example 1 having a 40% carbon burn-off was used. Data from this chlorination are also shown in Table I.

EXAMPLE 6

In the procedure of Example 4, coal treated in accordance with Example 3 having a carbon burn-off of 5% was used. Data from this chlorination are shown in Table I.

EXAMPLE 7

In the procedure of Example 4, carbon prepared according to Example 3 having a 15% carbon burn-off was used. Data from this chlorination are also shown in Table I.

EXAMPLE 8

In the procedure of Example 4, granular (−18 mesh) anthracite coal was used without pretreatment. Data from this chlorination are also shown in Table I.

EXAMPLE 9

In the procedure of Example 4, granular petroleum coke (−8 mesh) was used. Data from this chlorination are also shown in Table I.

TABLE I

| Example Number | Treatment | % Carbon Burn-Off | Carbon Surface Area (m²/g.) | $CO_2:CO$ (average) | Vanadium Impurity Level (ppm) |
| --- | --- | --- | --- | --- | --- |
| 4 | Steam @ 890° C. | 5 | 104 | 0.08 | 101 |
| 5 | Steam @ 890° C. | 40 | 540 | 0.006 | <5 |
| 6 | Air @ 450° C. | 5 | 55–63 | 0.1 | 225 |
| 7 | Air @ 450° C. | 15 | 163 | 0.06 | <5 |
| 8 | None (Coal) | 0 | 0.1 | 0.4 | 225 |
| 9 | None (Petroleum Coke) | 0 | <0.1 | 2.2 | 780 |

EXAMPLE 10

In order to further characterize the carbons useful in the present invention, three high surface area carbons were selected. Using the BET technique, surface area in <20 Å diameter pores was measured and then surface area in >20 Å diameter pores was measured. The total surface area is the sum of these two measurements.

These carbons were then heated to 1000° C. in a $N_2$ atmosphere (to simulate heating to chlorination temperatures) and the respective surface areas were again measured. Data are shown in Table 2.

The data show that heating air-treated coals to chlorination temperature results in a loss of surface area in both <20 Å and >20 Å diameter pores. Steam-treated coals lose surface area due to a decrease in <20 Å diameter pores only. Charcoal, in contrast to the treated coals, gains surface area after heating to a chlorination temperature, due mainly to the formation of small pores.

TABLE II

| Carbon Source Pretreatment | Anthracite Air @ 450° to 15% Burn-Off | | Anthracite Steam @ 890° to 10% Burn-Off | | Hickory Charcoal Not Specified | |
| --- | --- | --- | --- | --- | --- | --- |
| Heated to 1000° C. in $N_2$ | No | Yes | No | Yes | No | Yes |
| Surface Area in <20Å Diameter Pores | 110 | 41 | 215 | 137 | 0 | 62 |
| Surface Area in >20Å Diameter Pores | 66 | 9 | 10 | 12 | 19 | 25 |
| Total Surface Area | 176 | 50 | 225 | 149 | 19 | 87 |

Further, it has now been found that the porous carbon reductants useful in the present invention must contain micropores having a pore diameter of less than about 20 Å. Typically, useful carbons will have at least about 10 m²/g. of surface area in such micropores, advantageously at least about 100 m²/g. of surface area in such micropores and preferably about 500 m²/g. of such internal surface. Non-porous carbons and carbons having only large pores, e.g. charcoal, are not within the scope of the present invention.

The carbon particles can be any useful size. For a fluidized bed process the particles must be small enough to be fluidized by the fluidizing gas and yet be large enough such that they are not carried out of the fluid bed by the off-gas stream. Granular materials of about −8 mesh are typical. However, the average particle size can range from about 4 mesh to about 200 mesh and be useful. Preferably, the carbon particles will have an average particle size greater than about 100 mesh and will be substantially retained on a 40 mesh screen.

The granular titaniferous material useful in the present invention can be any titanium-containing compound or raw material such as rutile ore, ilmenite ore, or other. Naturally occurring sand-sized rutile ore is a convenient source, typically being −40 mesh and +140 mesh. However, granular titaniferous materials having an average particle size from about 4 mesh to about 200 mesh can be used. The titaniferous material can be substantially pure or contain a wide variety of impurities. For practical operation the titaniferous material should contain at least about 90% $TiO_2$; however, the process will operate with lesser amounts present.

What is claimed is:

1. A process for chlorinating a vanadium-containing titaniferous material in the presence of carbon to produce $TiCl_4$, which comprises selectively reacting vanadium values in vanadium-containing titaniferous materials to a valence no greater than +3 to facilitate their separation from $TiCl_4$ by
    (a) fluidizing particulate vanadium-containing titaniferous material and a particulate porous carbon reductant derived from anthracite coal, said porous carbon being characterized in that said porous carbon has an internal surface area of at least about 100 m²/g. of which at least about 10 m²/g. of such internal surface area is in micropores having a pore diameter of less than about 20 Angstroms,
    (b) contacting said fluidized particulate materials with a chlorine providing gas at a temperature of at least about 800° C. until the titanium and vanadium contents of said titaniferous material are substantially chlorinated and the vanadium is substantially entirely at a valence no greater than +3,
    (c) cooling said chlorinated titanium and vanadium contents in the reaction medium to a temperature less than about 450° C. to produce first and second separable phases, the first of said phases containing substantially all of the trivalent or less vanadium values as a chlorine-containing derivative, and a second of said phases containing $TiCl_4$; and
    (d) physically separating said first and second phases whereby the vanadium level in the $TiCl_4$ product is less than about 10 parts per million.
2. The process of claim 1 wherein the pores in said porous carbon reductant is produced by treatment with air, $CO_2$, and/or steam at a temperature in excess of about 400° C.
3. The process of claim 1 wherein said chlorine-providing gas is $Cl_2$.
4. The process of claim 1 wherein said carbon has at least about 100 m²/g. of internal surface area in said micropores.
5. The process of claim 1 wherein said carbon has at least about 500 m²/g. of internal surface area in said micropores.
6. The process of claim 1 wherein said titaniferous materials contain at least about 90% by weight $TiO_2$.

* * * * *